UNITED STATES PATENT OFFICE.

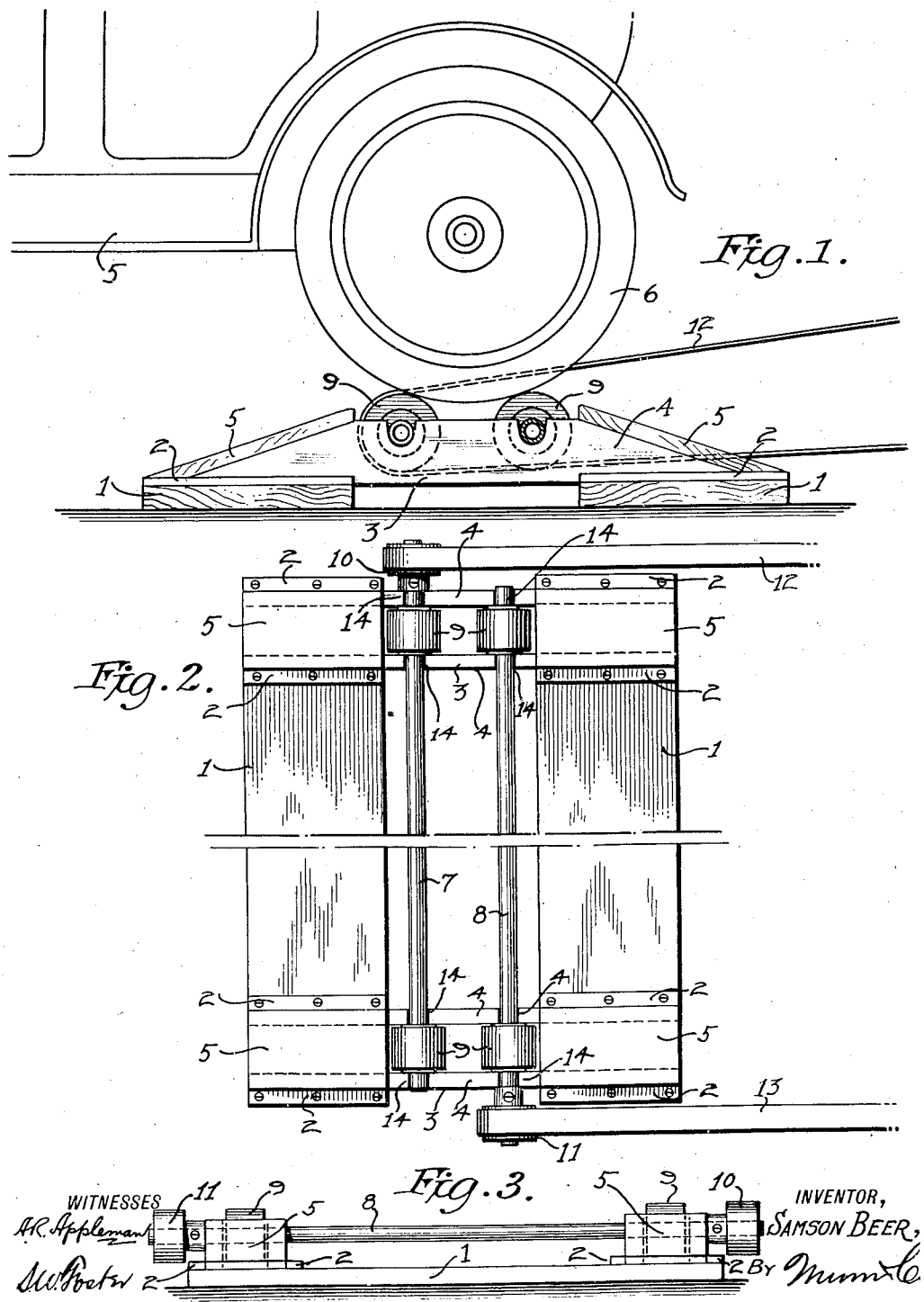

SAMSON BEER, OF SACRAMENTO, CALIFORNIA.

POWER DEVICE.

1,356,423.   Specification of Letters Patent.   Patented Oct. 19, 1920.

Application filed November 6, 1919. Serial No. 336,013.

*To all whom it may concern:*

Be it known that I, SAMSON BEER, a citizen of the United States, and a resident of the city of Sacramento, in the county of Sacramento and State of California, have invented a new and Improved Power Device, of which the following is a full, clear, and exact description.

This invention relates to improvements in power devices, and more particularly to a device adapted to be driven by the drive wheels of an automobile, an object of the invention being to provide a device of the character stated which can be quickly assembled and taken apart and which can thus be easily transported from place to place.

A further object is to provide a device of the character stated which can be utilized for operating two or more machines and which is so constructed that a car can be conveniently run into operative position or moved off the same when desired.

With these and other objects in view, the invention consists in certain novel features of construction and combinations and arrangements of parts as will be more fully hereinafter pointed out and described in the claim.

In the accompanying drawings:

Figure 1 is a view in side elevation illustrating my improvements.

Fig. 2 is a plan view.

Fig. 3 is an end view.

1 represents a pair of supporting planks having on their upper faces, adjacent their ends, pairs of guide strips 2—2.

Frames 3 are mounted on the planks 1 and fit between the pairs of guide strips 2. These frames comprise parallel bars 4, secured at their ends to inclined blocks 5 located between them and constituting runways for the driving wheels 6 of an automobile.

The bars 4 have alined bearing recesses 14 supporting parallel shafts 7 and 8, the latter having rollers 9 secured thereon and located between the bars 4, thereby holding the shafts against longitudinal movement in the bearing recesses.

A pulley 10 is secured on one end of shaft 7 and a pulley 11 is secured on the opposite end of shaft 8 and belts 12 and 13 are driven by the pulleys 10 and 11 respectively and transmit power to any desired machines.

The device can be quickly assembled and the drive wheels 6 of the automobile run thereon by movement up one pair of inclined blocks 5 onto the rollers 9. When the front wheels of the automobile are blocked the power of the engine transmitted to the drive wheels 6 will be imparted to the rollers 9 and shafts 7 and 8 and from the latter to the belts 12 and 13 through the medium of the pulleys 10 and 11.

When the device is not desired for use the shafts 7 and 8 can be lifted out of their bearing recesses 14 and frames 3 lifted off the planks 1 and all of the parts conveniently stored or carried from place to place.

Various slight changes might be made in the general form of the parts described without departing from my invention, and hence I do not limit myself to the precise details set forth, but consider myself at liberty to make such slight changes and alterations as fairly fall within the spirit and scope of the appended claim.

I claim:

A device of the character stated, comprising a pair of supporting boards, a pair of frames removably secured on the boards adjacent the ends of the latter, said frames each comprising parallel members having alined recesses in their upper faces, shafts removably supported in said recesses, rollers on the shafts adapted to be engaged by the wheels of an automobile, said frames inclined downwardly toward both ends, and said rollers having their upper portions in a plane slightly above the plane of said frames.

SAMSON BEER.